No. 802,860. PATENTED OCT. 24, 1905.
A. HERZ.
VEHICLE SPRING.
APPLICATION FILED APR. 14, 1905.
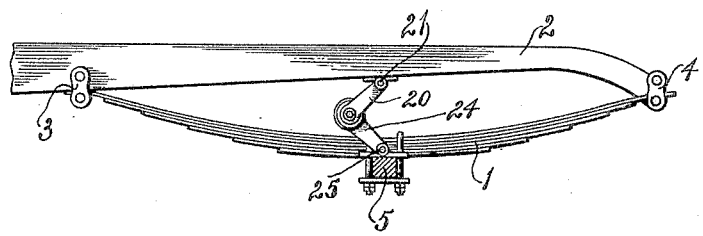
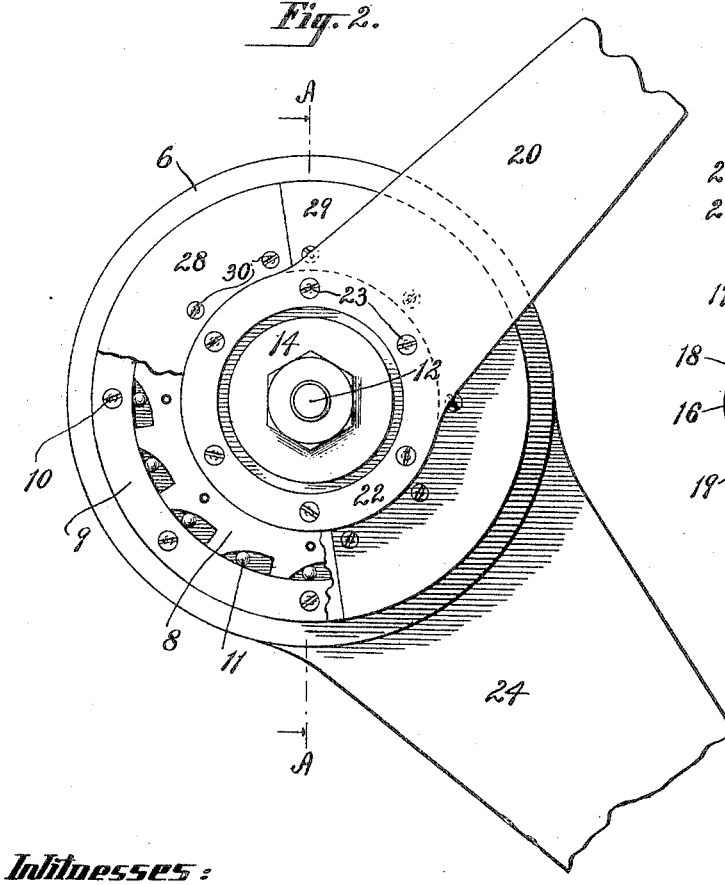
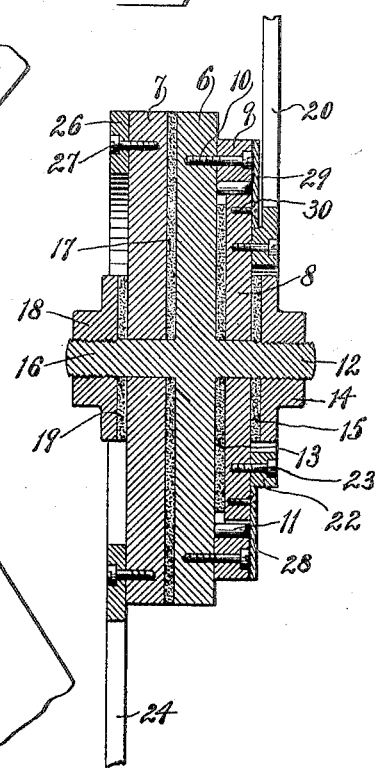

UNITED STATES PATENT OFFICE.

ADOLF HERZ, OF VIENNA, AUSTRIA-HUNGARY.

VEHICLE-SPRING.

No. 802,860. Specification of Letters Patent. Patented Oct. 24, 1905.

Application filed April 14, 1905. Serial No. 255,533.

*To all whom it may concern:*

Be it known that I, ADOLF HERZ, a subject of the Emperor of Austria-Hungary, and a resident of Vienna, Austria-Hungary, have invented a new and useful Vehicle-Spring, of which the following is a specification.

The object of my invention is to provide a device for use in connection with vehicles whereby the vehicle-spring may be permitted to be compressed under one degree of friction and permitted to expand under another degree of friction, thereby preventing undue vibration of the vehicle-body when the vehicle-wheels are subjected to severe jolts.

A practical embodiment of my invention is represented in the accompanying drawings, in which—

Figure 1 represents my improved antivibration device in side elevation, so much of a vehicle-body frame, axle, and spring being shown as will give a clear understanding of the location of the device with respect to the same. Fig. 2 is an enlarged view of a portion of the device in side elevation, the protecting-plate being broken away to more clearly illustrate the roller-clutch; and Fig. 3 is a central transverse section taken in the plane of the line A A of Fig. 2 looking in the direction of the arrows.

The vehicle-spring 1 is herein represented as of the well-known semi-elliptical form, its ends being connected to the body-frame 2 by the usual shackles 3 4. The support for the spring (in the present instance the axle-bar) is denoted by 5.

My improved antivibration device comprises, broadly, three frictionally-engaged parts, (shown herein as a middle disk 6 and two outer disks 7 and 8,) the disk 8 forming the inner member of a roller-clutch, the outer member 9 of which forms a permanent part of the middle disk 6. I have shown in the accompanying drawings the outer ring member 9 of the clutch as permanently secured to one face of the middle disk 6 by suitable fastening-screws 10. An annular series of rollers 11 are interposed between the clutch members 8 and 9, the clutch member 9 having a cylindrical interior wall and the clutch member 8 having a plurality of cam-surfaces so arranged that when the clutch member 8 is rotated in one direction it will be released from the clutch member 9 and when rotated in the opposite direction it will be clutched thereto. The clutch member 8 is mounted to rotate on a bolt 12, which projects from one face of the middle friction-disk 6. A washer 13, of some suitable frictional material—such, for instance, as leather—is interposed between the disks 6 and 8. These two disks are brought into the desired frictional engagement with each other, so as to retard the reverse movement of the disk 8 when unlocked from the disk 9, as follows: A nut 14 has a screw-threaded engagement with the end of the bolt 12, and a washer 15, of frictional material—such, for instance, as leather—is interposed between the inner face of the nut and the outer face of the disk 8. As the nut is screwed inwardly it will be seen that it will increase the frictional engagement between the disks 6 and 8.

The bolt 16 projects from the other face of the disk 6 in alinement with the bolt 12, and on this bolt I mount the disk 7. A washer 17, of frictional material—such, for instance, as leather—is interposed between the adjacent faces of the disks 6 and 7. The amount of friction between these two disks may be accurately regulated by the following adjustable means: A nut 18 has a screw-threaded engagement with the free end of the bolt 16, and between this nut and the outer face of the disk 7 is placed a washer 19, of some suitable frictional material—such, for instance, as leather. As the nut 18 is screwed inwardly it will increase the frictional engagement between the disks 6 and 7.

The disk 8 is provided with an arm 20, which is pivoted to the body-frame 2 or other part supported by the spring, as shown at 21. The inner end of this arm 20 is permanently secured to the disk 8 by providing the arm with a ring 22, which surrounds the nut 14 and is secured to the outer face of the disk 8 by screws 23.

The friction-disk 7 is provided with an arm 24, which is pivoted to the spring-support—in the present instance the axle-bar 5, as shown at 25. This arm 24 is provided with a ring 26, which is secured to the outer face of the disk 7, near its periphery, by suitable screws 27.

A protecting-plate for the clutch may be secured to the outer face of the disk 8, which plate in the present instance consists of two members 28 and 29, secured to the outer face of the disk 8 by suitable screws 30. This plate overlaps the outer face of the outer clutch member 9 and serves to retain the rollers in position.

The device is so attached to the vehicle that the arms will be at the desired angle with respect to each other at that side of the clutch which will permit the arms to be swung toward each other with the clutch unlocked and the desired amount of friction between the disks 8 and 6. This arrangement will permit the device to retard the expansion of the spring with a predetermined degree of friction between the disks 6 and 7 when the disks 6 and 8 are locked together by the clutch. By this arrangement I am enabled to retard the compression of the spring with one degree of friction and to retard the expansion of the spring at a greater degree of friction, thus not only strengthening the spring as to compression, but also preventing undue jumping of the vehicle-body when the traction-wheels are subjected to a jolt or other severe strain.

What I claim as my invention is—

1. The combination with a vehicle-spring, of means for retarding the compression of the spring with one degree of friction and another means for retarding the expansion of the spring under another degree of friction.

2. The combination with a vehicle-spring, of means for retarding the compression of the spring with a lesser degree of friction and another means for retarding the expansion of the spring with a greater degree of friction.

3. The combination with a vehicle-spring, of means for retarding the compression of the spring with one degree of friction and the expansion of the spring with another degree of friction comprising two frictionally-engaged parts, means for adjusting their frictional engagement, a third part, means for adjusting its frictional engagement with one of the two frictionally-engaged parts and a clutch interposed between the third part and one of the frictionally-engaged parts for locking and releasing the third part according to the direction of its movement.

4. The combination with a vehicle-spring, of a friction-disk having oppositely-extended bolts, a second disk rotatably mounted on one of the bolts and means engaging the bolt for adjusting the frictional engagement of the two disks, a third disk rotatably mounted on the other bolt, means engaging the bolt for adjusting the friction between the first and last named disks, and a roller-clutch interposed between the said first and last named disks.

In testimony that I claim the foregoing as my invention I have signed my name, in presence of two witnesses, this 13th day of March, 1905.

ADOLF HERZ.

Witnesses:
 FREDK. HAYNES,
 C. S. SUNDGREN.